June 21, 1938.  R. HAFNER  2,121,345
ROTATIVE WING AIRCRAFT
Filed Aug. 6, 1934  2 Sheets-Sheet 1
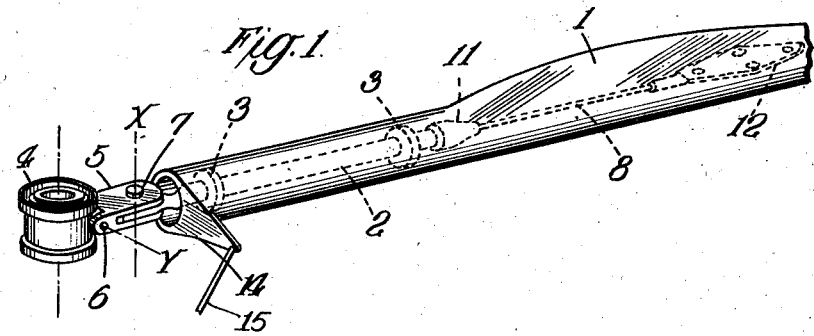
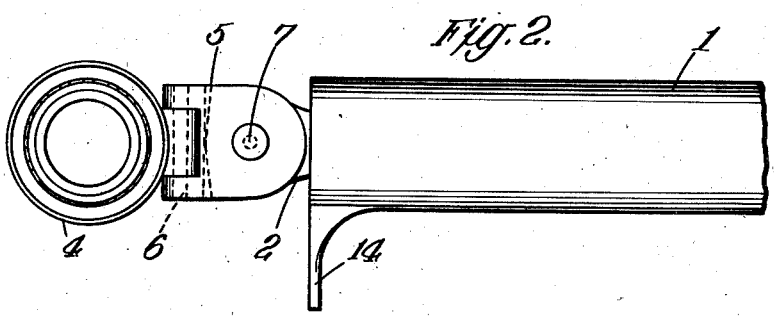
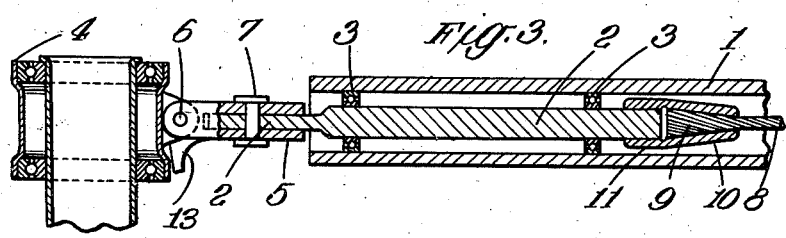
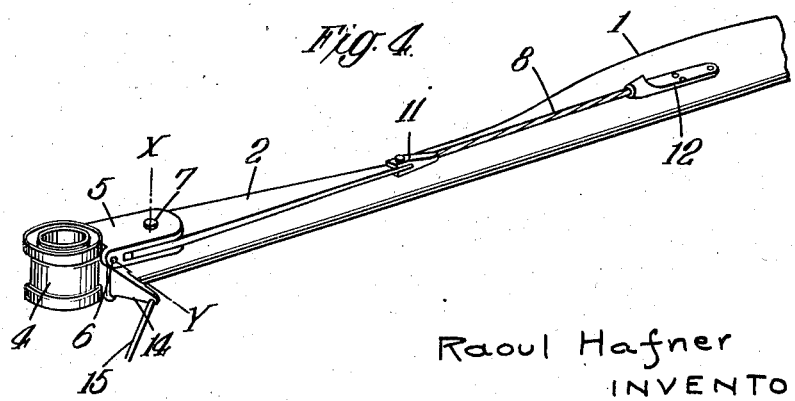
Raoul Hafner
INVENTOR
his ATTY.

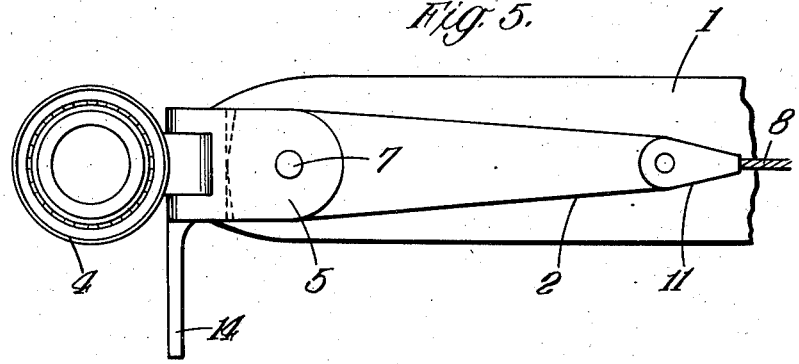
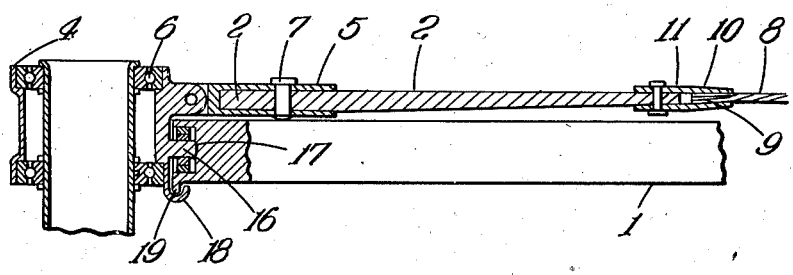
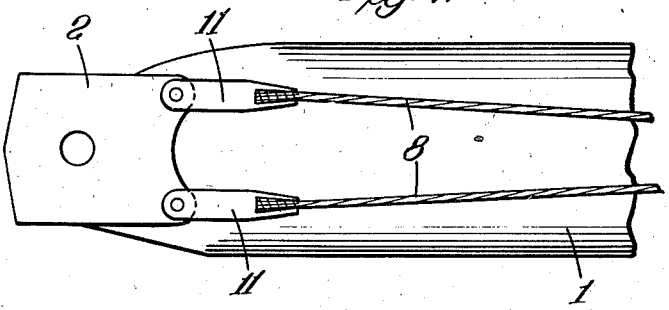

Patented June 21, 1938

2,121,345

UNITED STATES PATENT OFFICE 2,121,345

ROTATIVE WING AIRCRAFT

Raoul Hafner, Vienna, Austria

Application August 6, 1934, Serial No. 738,702
In Great Britain August 25, 1933

5 Claims. (Cl. 244—18)

The present invention relates to rotative wing aircraft, that is to say aircraft comprising a system of supporting surfaces or blades rotative about a vertical or approximately vertical axis.

In such aircraft in which the wing system is auto-rotative (hereinafter termed windmill planes), the blades require to be at a negative angle of incidence to the direction of rotation, whereas in the case of aircraft in which the wing system is power driven to provide direct lift (usually termed helicopters), the blades require to be at a positive angle of incidence to the direction of rotation.

Such aircraft may be stabilized by allowing the blades to flap up and down and to rock laterally through a small angle about the axis of rotation or an axis parallel thereto.

The primary object of this invention is to enable the angle of the blades of such aircraft to be easily and quickly changed by the pilot from a positive to a negative value or vice versa without losing the speed of rotation so that a "helicopter" may be flown as a "windmill plane" or vice versa as desired.

According to this invention each blade of a "helicopter" or "windmill plane" is provided with means for connecting it against centrifugal force to the central hub while permitting it to move angularly on its longitudinal axis and to flap up and down transversely to the plane of rotation and/or to rock through a small angle about the axis of rotation of the system or an axis parallel thereto.

Certain constructional embodiments of the invention are illustrated by the accompanying drawings, wherein:—

Figure 1 is a perspective view showing one construction according to the invention for connecting a blade to the hub.

Figure 2 is a plan of the universal joint connection of Figure 1 drawn to a larger scale.

Figure 3 is a sectional side view of Figure 2.

Figure 4 is a perspective view of another construction according to the invention.

Figure 5 is a plan of the universal joint of Figure 4 drawn to a larger scale.

Figure 6 is a sectional side view of Figure 5.

Figure 7 is a plan of a modification of the construction illustrated by Figures 4, 5 and 6.

In the example of construction shown in Figures 1, 2 and 3, each blade is hollow and is mounted to swivel upon a radial member 2 by means of ball bearings 3. The radial member 2 is connected to the hub 4 by means of a universal joint member 5 (U-shaped as seen in side view) which is pivoted at 6 to rock up and down about the axis Y lying in a plane at right angles to the axis of the hub 4, and the member 2 is pivoted to the member 5 at 7 to rock laterally about the axis X which is parallel with the hub axis. The inner edge of the radial member 2 is symmetrically bevelled as shown relatively to the straight bottom face of the universal joint member 5, so that the blade may rock laterally about 4° on either side of the normal position. The radial member 2 is connected to the blade 1 by a tension cable 8 which is torsionally flexible. The cable 8 is enlarged or expanded at its ends 9 and these ends are engaged by correspondingly shaped ferrules 10 formed respectively on a cap 11 screwed on the member 2 and on a plate 12 attached to the blade 1. The universal joint member 5 is provided with a stop 13 adapted to engage the side of the hub 4 and support the blade when the wing system is not rotating.

The blade 1 is provided with a radius rod 14 operated by a link 15 from mechanism, whereby the inclination of the blades can be given varying angles of incidence or setting as a whole as well as during their rotation so that the lifting action can be varied as a whole as well as made different at different points of the circle of revolution, the points in the said circle of greatest or smallest angle of incidence being variable at will.

In operation when the wing system is running at speed the centrifugal force is taken by the tension member 8 and the bearings 3 are relieved of any friction due to centrifugal force, thereby enabling the inclination of the blade to be varied with ease and rapidity. The universal joint member 5 enables the blade to flap up and down about the axis Y or rock laterally about the axis X to such an extent as may be necessary to maintain stability and secure a balance of forces.

In the construction shown in Figures 4, 5 and 6, the tension member 8 is mounted outside the blade and parallel to it. The radial member 2 is connected to the universal joint member 5 as previously described and the blade 1 is swivelled by means of a spherical bearing to a radial pivot 16 projecting outwardly from the hub 4, the inner ring of said bearing being capable of sliding axially on the said pivot. The end 17 of the said pivot 16 acts as a stop to support the blade when the wing system is not rotating. Another stop 18 on a lug from the hub 4 engages with a lug 19 on the blade 1 to prevent the blade from lifting off the swivel pin 16.

In this construction also it will be clear that the centrifugal force is taken by the tension member 8 and that no additional friction is thrown upon the spherical bearing due to centrifugal force.

In the modification of the construction of Figures 4, 5 and 6 which is shown in Figure 7, the blade 1 is externally braced by two tension wires 8 connected at one end to the blade at a common point and at the inner end to opposite corners of the member 2 by means of caps 11.

In cases where it is not desired to allow lateral rocking motion of the blades, the bevelling of the inner edge of the member 2 of the constructions above described may be dispensed with and the said edge may be straight and contact closely with the straight bottom face of the universal joint member 5.

What I claim and desire to secure by Letters Patent of the United States is:—

1. In rotative wing aircraft, the combination with a rotative hub, of a plurality of sustaining blades extending outwardly therefrom and controllable as to pitch, about their individual longitudinal axes, and a torsionally resilient tie, forming the sole anchorage of each blade to said hub against centrifugal force in flight, lying on the said axis of each blade with its outer and inner ends secured respectively to such blade and to a root attachment member articulated to said hub.

2. In rotative wing aircraft the combination according to claim 1, and wherein the root portion of each blade is tubular, surrounding said tie and journalled about its axis to a part of said root attachment member, said tie being secured at its outer end to the interior of said blade at a point intermediate in the length of the latter.

3. In a rotative wing aircraft the combination with a rotative hub, of a plurality of controllable-pitch flapping blades radiating therefrom, and a corresponding plurality of torsionally flexible means each anchoring one blade directly to said hub against centrifugal force in flight and pivotally secured to said hub to flap with its associated blade.

4. In a rotative wing aircraft the combination, with a rotative hub, of a plurality of controllable-pitch flapping blades radiating therefrom and a corresponding plurality of torsionally resilient radial tie members each anchoring one blade directly to said hub against centrifugal force in flight and pivotally secured to said hub to flap with its associated blade.

5. In a rotative wing aircraft the combination, with a rotative hub, of a plurality of flapping blades radiating therefrom and controllable as to pitch, and a corresponding plurality of torsionally resilient radial tie members each anchoring one blade directly to said hub against centrifugal force in flight and pivotally secured to said hub to flap with its associated blade.

RAOUL HAFNER.